United States Patent
Doemens et al.

(10) Patent No.: US 6,772,647 B2
(45) Date of Patent: Aug. 10, 2004

(54) ACTUATOR-INTEGRATED FORCE SENSOR

(75) Inventors: Guenter Doemens, Holzkirchen (DE); Dieter Spriegel, Munich (DE); Hans Wuensche, Penzing/Ramsach (DE)

(73) Assignee: Pacifica Group Technologies Pty Ltd., East Bentleigh (AU)

( * ) Notice: Subject to any disclaimer, the term of this patent is extended or adjusted under 35 U.S.C. 154(b) by 0 days.

(21) Appl. No.: 10/148,948

(22) PCT Filed: Dec. 4, 2000

(86) PCT No.: PCT/DE00/04319
§ 371 (c)(1),
(2), (4) Date: Sep. 9, 2002

(87) PCT Pub. No.: WO01/42755
PCT Pub. Date: Jun. 14, 2001

(65) Prior Publication Data
US 2003/0074977 A1 Apr. 24, 2003

(30) Foreign Application Priority Data
Dec. 7, 1999 (DE) ......................... 199 58 903

(51) Int. Cl.⁷ ............................... G01L 1/04
(52) U.S. Cl. ............................. 73/862.471; 73/862.451
(58) Field of Search ..................... 73/862.472, 862.473, 73/862.474, 862.451, 862.391, 760, 781, 789, 788, 794, 795, 862

(56) References Cited

U.S. PATENT DOCUMENTS

| | | | | |
|---|---|---|---|---|
| 3,626,814 A | * | 12/1971 | Andersson | 92/98 R |
| 5,313,022 A | * | 5/1994 | Piroozmandi et al. | 177/211 |
| 6,048,723 A | * | 4/2000 | Banes | 435/305.1 |
| 6,279,407 B1 | * | 8/2001 | Park et al. | 73/862.391 |

* cited by examiner

Primary Examiner—Edward Lefkowitz
Assistant Examiner—Alandra Ellington
(74) Attorney, Agent, or Firm—Laurence A. Greenberg; Werner H. Stemer; Gregory L. Mayback

(57) ABSTRACT

The present invention is based on an use of the already existing actuator bottom as a deformation element for a direct measurement of braking force, and on its geometric configuration in order to measure a force in a way which is largely independent of temperature and free of hysteresis. Accordingly, a force sensor is integrated into an actuator for generally or transmitting a force in the force flux. The actuator bottom is transverse to the force flux.

3 Claims, 4 Drawing Sheets

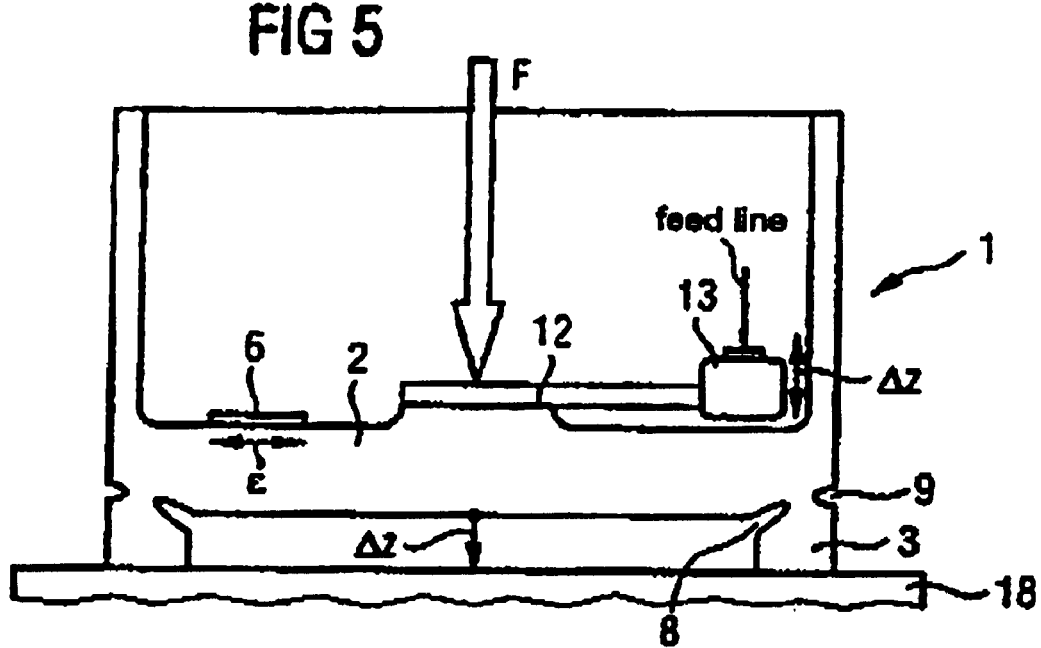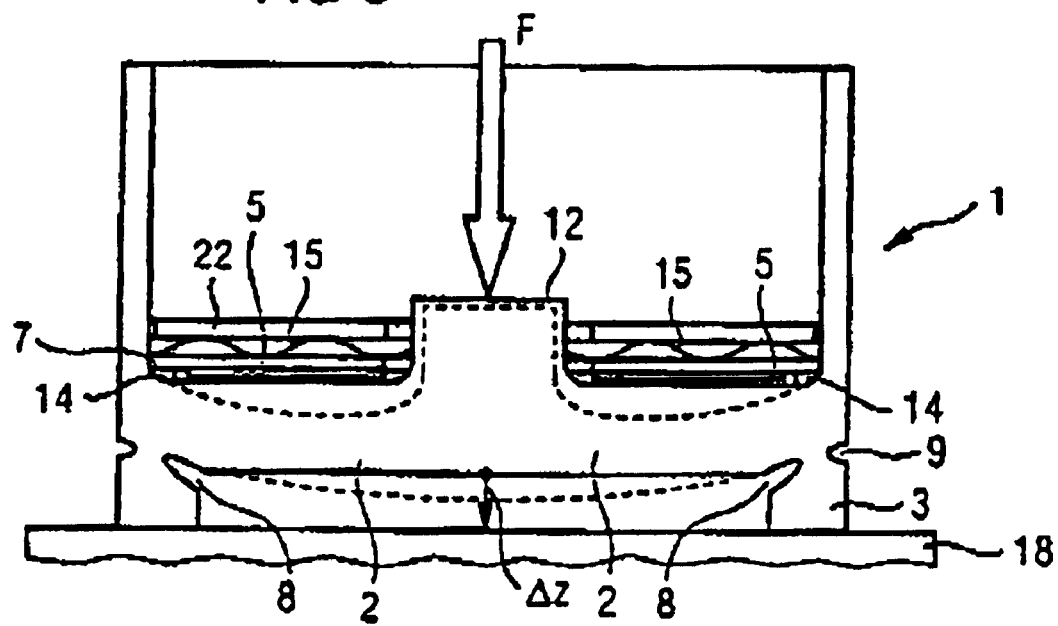

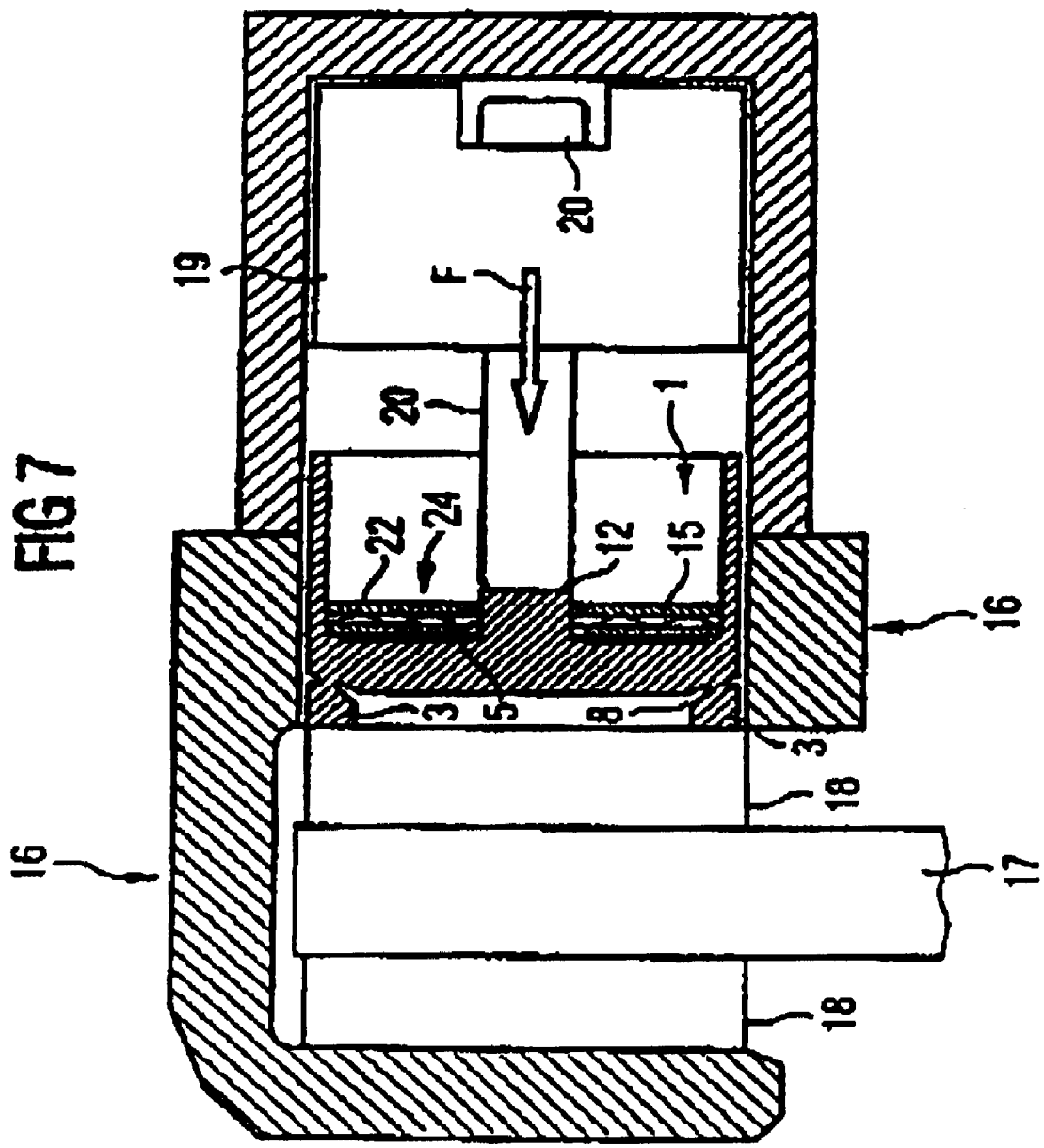

ACTUATOR-INTEGRATED FORCE SENSOR

CROSS-REFERENCE TO RELATED APPLICATIONS

This is a national application for International Application No. PCT/DE00/4266 which was filed on Nov. 30, 2000 and which published in German on Jun. 7, 2001 which in turn claims priority from 199 58 251.3, which was filed on Dec. 3, 1999 of which the following is a of which the following is a specification.

FIELD OF THE INVENTION

The invention relates to a force sensor which is integrated into an actuator for generating or transmitting a force in the force flux and has an actuator bottom that is transverse to the force flux.

BACKGROUND OF THE INVENTION

In motor vehicles, the braking function is implemented nowadays by means of hydraulically activated actuators. In the method designated as "brake-by-wire", electrically operated braking devices are used. In said braking devices, actuators, (i.e. elements in which the braking force is generated and by means of which the braking force is transmitted), are activated by means of electromotive step-down drives. The resulting advantages are the individual and variable configuration of the braking process and the possibility of simultaneously performing further functions, for example the ABS function (Anti-lock Braking System). As an electromechanical braking system will generally operate with controlled braking force, the precise measurement of the braking force is essential to the performance of the overall system. High demands are made on the precision of the system due to the synchronous operation. For example, fault tolerances should be <1% even if the braking force is, for example, 5 t. The measuring task is additionally made considerably more difficult as a result of limited accessibility to relevant measurement locations, the small amount of free space in the direction of force and the extremely high spatial, and chronological temperature gradients. These aspects rule out the use of known force sensors such as, for example, strain gauges.

SUMMARY OF THE INVENTION

The present invention is based on the object of enabling precise and unambiguous sensing of braking forces as close as possible to the location where the braking force acts. More specifically, the invention is based on the recognition that a force sensor can easily be integrated into an actuator. The deflection of an actuator bottom or of a braking piston bottom (a designation by analogy with hydraulic systems) can be used as a measurement variable for the braking force. The actuator bottom is appropriately configured for this purpose. The actuator is generally constructed in the form of a hollow cylinder, having an actuator bottom, and also containing a supporting ring by which it bears directly or indirectly on the brake lining of a brake. The braking force is generated centrally and applied to the actuator bottom.

The deformation of the actuator bottom is advantageously determined by means of various measuring methods. One method which is suitable for series production is the capacitive measuring method, whereby the actuator bottom constitutes an electrode of a capacitor and the capacitance which is changed with the deformation is determined. The capacitor will therefore generally be a plate capacitor. The electrode which lies opposite the actuator bottom is embodied as a plate and which is pressed onto a base with spring support so that the high temperature gradients do not cause any mechanical stresses to be transmitted to the insulator of the electrode. Thus this ensures a defined electrode spacing, as is described in the European patent EP 0 849 576 B1.

The connecting point between the actuator bottom, namely the rear part of the actuator which is generally of cylindrical construction, and the supporting ring, is embodied so as to be relatively rigid, since the braking force can cause torques to be transmitted to the supporting ring at this point and said torques cause the measurement to be subject to a hysteresis due to friction effects. For this reason, the material cross section at this connecting point is advantageously reduced by an internal peripheral groove, an external peripheral groove, or by means of a combination thereof so that only minimum torques are transmitted.

The measures which are provided for minimized hysteresis are likewise suitable for suppressing in the axial direction a temperature gradient in the actuator bottom due to largely radial introduction of heat. Axial temperature gradients can cause the actuator bottom to bulge in the direction of the force to be measured and result in an incorrect measurement.

BRIEF DESCRIPTION OF THE DRAWINGS

Exemplary embodiments of the present invention are described below with reference to drawings, in which

FIG. 5 illustrates an actuator with measuring elements for the deformation $\Delta Z$; and FIG. 6 illustrates an actuator with capacitive measuring device for the deformation $\Delta Z$; and FIG. 7 illustrates a schematic sectional view of a motor vehicle braking system with a sensor integrated in the frictional engagement and in the actuator.

DETAILED DESCRIPTION OF THE INVENTION

A significant aspect of the invention consists in the integration of the force sensor in the actuator, the actuator bottom being used as a measuring element. The elastic deformation of the actuator bottom with corresponding application of a force is thus the measurement variable at this deformation element. The magnitude of the force can be inferred from the deformation.

In order to prevent temperature-induced deformation at the actuator bottom in the measuring direction, i.e. in the direction of force, it is ensured that at the connecting point between the actuator bottom and supporting ring the application of the temperature or the introduction of the heat is such that temperature gradients are minimized in the direction of force, which is equivalent to an approximately axial profile of the isotherms formed in the direction of force. The heat flow will thus run inwards almost exclusively in the radial direction.

In order to prevent hysteresis effects during various load changes in which the force is increased and decreased, the generation or torques and their transmission to the supporting ring are minimized in a targeted fashion. This leads to the connecting point between the actuator and the supporting ring being embodied in a way similar to a joint. As the actuator bottom serves as a diaphragm-like deformation element, when force is applied to the connecting point between the actuator bottom and external cylinder or supporting ring, a torque will be generated which has a center of rotation positioned within a T connection. This leads to a radial migration of the supporting face of the supporting ring on the brake lining. As a result of friction forces present at the supporting point, when the load is reduced the original supporting position is no longer reached, so that hysteresis effects arise which prevent reproducible measurements. As a result of appropriately formed grooves which are constructed on the periphery, the transmission of torques at the point in question is prevented.

Figure 1:
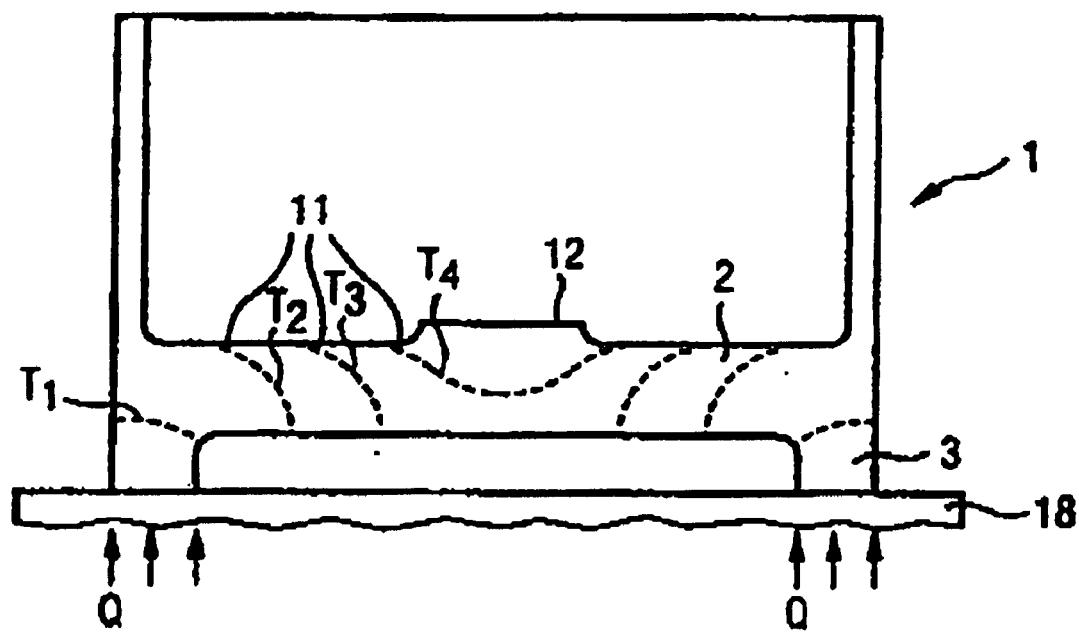
FIG. 1 illustrates an actuator bottom with supporting ring, isotherms and the heat flow being indicated.
Figure 2:
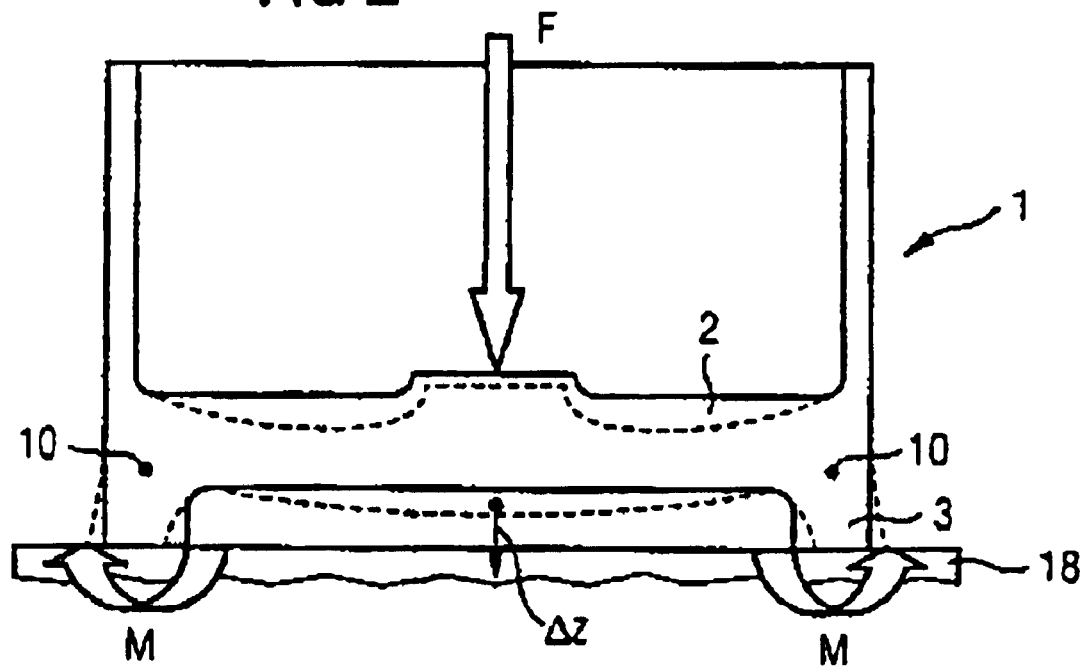
FIG. 2 illustrates an actuator bottom in the state of rest and in the deformed state.

FIG. 1 shows a section through actuator 1, the actuator bottom 2 being arranged perpendicularly with respect to the direction of force. The direction of force is illustrated in FIG. 2. In addition, FIG. 1 shows a base plane 12 as an application point for the force, a supporting ring 3, a brake lining 18, and the direction of the heat flow. The actuator 1 has an overall cylindrical shapes for the most part is a hollow cylinder shape. The supporting ring 3 is arranged in the region of the outer periphery of the actuator bottom 2, in the direction of force behind the actuator bottom 2. In order to guide the actuator bottom, the hollow-cylinder form is extended opposite the supporting ring 3, beyond the actuator bottom 2 and counter to the direction of force. Furthermore, isotherms 11, which characterize various temperatures $T_1$ to $T_4$, are entered in the actuator bottom 2. The construction corresponding to FIG. 1 does not contain any sensor elements and does not have any features which can prevent temperature effects, or hysteresis effects. The central feature in FIG. 1 is that the heat flow Q, starting from the brake system with the brake lining 18 on which the supporting ring 3 rests, is introduced into the actuator bottom 2 in such a way that temperature gradients occur in the direction of force in the actuator bottom 2. This leads to temperature-induced deformations of the actuator bottom, which results in incorrect measurement of the force.

FIG. 2 shows a view corresponding to FIG. 1 wherein the force F, and the braking force, are shown schematically, as is the deformation of the actuator bottom 2 in the form of the deflected actuator bottom 2. The maximum deflection $\Delta Z$ will occur in the center of the usually radially symmetrical component. The deformation which is shown will generate a torque at the connecting point between the actuator bottom 2 and the supporting ring 3. The center of rotation 10 of said torque is designated. As a result of this torque, the surface of the supporting ring 3 which rests on the brake lining 18 will be displaced outward when force is applied. The torques M are indicated schematically.

Figure 3:
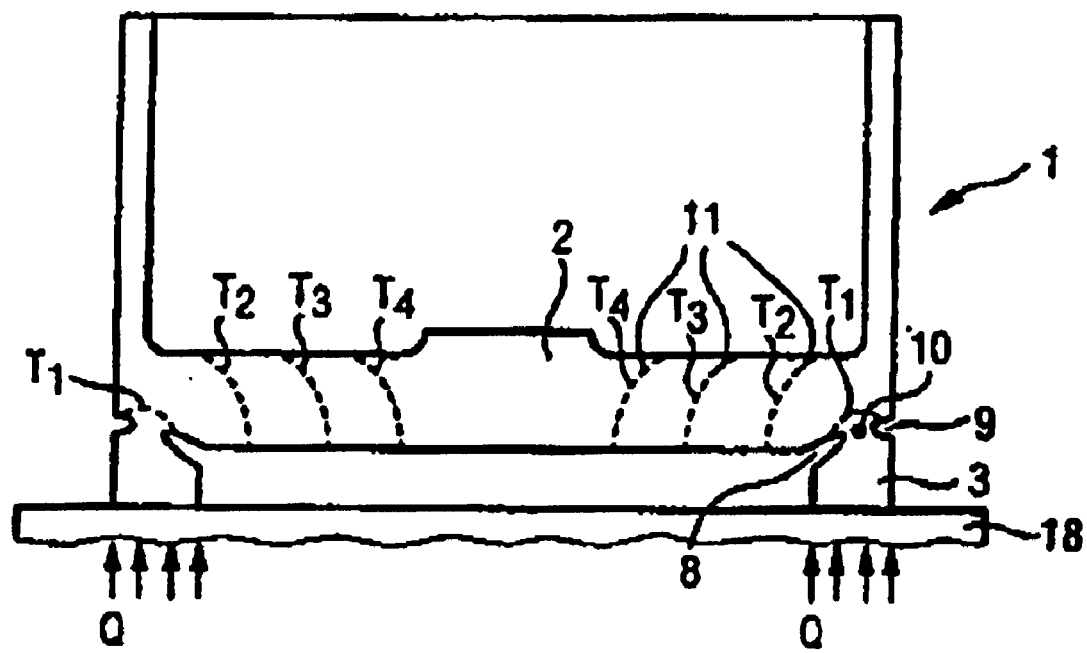
FIG. 3 illustrates an actuator with grooves provided on the inner and outer peripheries in order to reduce the material cross section between the actuator bottom and supporting rings.

FIG. 3 s is a view corresponding to FIG. 1, wherein the heat flow is introduced into the actuator bottom 2 virtually perpendicularly to the direction of force, i.e. radially from the outside to the inside, by means of an inner peripheral groove 8 and an outer peripheral groove 9. This gives rise to isotherms 11 which are approximately parallel to the force. As a result, no temperature-induced deformations occur.

Figure 4:
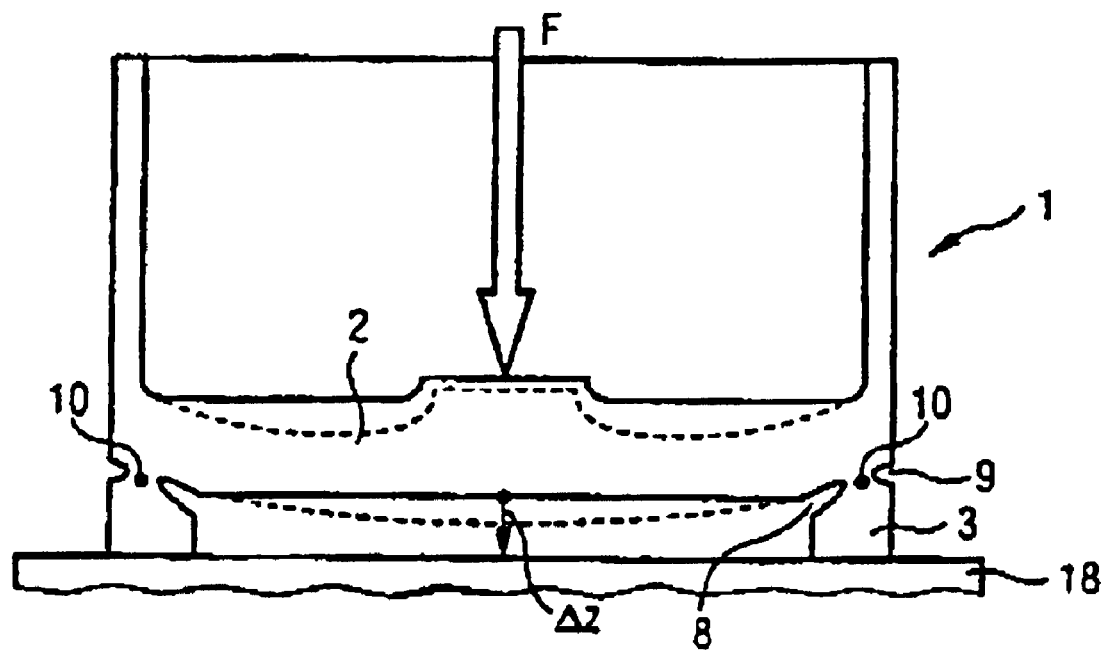
FIG. 4 illustrates shows a view corresponding to FIG. 2, but with a hysteresis-free deformation path of the actuator bottom.

FIG. 4 shows an arrangement corresponding to FIG. 2, in which measures to eliminate torques M occurring when force is applied also take the form of peripheral grooves 8 and 9 between the actuator bottom 2 and supporting ring 3. Here, the actuator bottom 2 can be deflected by a maximum absolute value of $\Delta Z$ without torques occurring at its outer edges which act on the supporting ring 3 and which cause its supporting face on the brake lining 18 to migrate outward. The material cross section is correspondingly reduced by the grooves 8 and 9 so that a joint-like construction is achieved.

FIG. 5 shows an actuator arrangement with a measurement of the actuator bottom deflection $\Delta Z$ by different sensors. On the one hand, the deflection of the actuator bottom 2 can be measured inductively or optically with a contactless distance sensor 13. The contactless sensor is, for this purpose, mounted on the base plane 12 which is oriented perpendicularly with respect to the direction of force, and is thus displaced by $\Delta Z$ in accordance with the central region of the actuator bottom 2. This displacement is carried out in a contactless way by moving the sensor close to the actuator bottom 2.

A further measuring method includes the use of strain sensors 6 which are suitable for higher temperatures. These sensors measure, as their designation suggests, a strain $\epsilon$, which occurs when a force F acts on the actuator bottom 2. Metallic, semiconductor, or piezoresistive strain gauges, as well as capacitive strain sensors with silicon surface micromechanics can be used as strain sensors. As before, the peripheral grooves 8 and 9 are illustrated in FIG. 5, together with the bearing of the supporting ring 3 on the brake lining 18.

FIG. 6 shows the actuator 1 with a capacitive measuring arrangement, whereby $\Delta Z$ is again measured. The capacitive measuring arrangement contains an electrode 5 which is positioned on an electrode mount 7. The electrode mount is pressed in its outer region onto a base 14 with spring support. The base 14 will remain fixed, even when force is applied. The spring support is brought about by means of the spring 15 which is supported on the rear cover 22. This ensures that the electrode 5 is oriented approximately plane-parallel with respect to the actuator bottom 2 in the position of rest. The actuator bottom 2 thus constitutes the opposite electrode corresponding to the electrode 5. A change in the distance between these two electrodes generates a signal which is proportional to $\Delta Z$.

FIG. 7 shows the entire arrangement of a brake system which engages a brake disc 17. The brake linings 18 which are held together by the brake caliper 16 are pressed on both sides against the brake disc 17 if a spindle 20 exerts a braking force on the actuator 1 by electromotive means via the motor 19. The electromotive drive is usually connected to a step-down gear mechanism. The spindle 20 transmits the braking force centrally onto the actuator bottom 2, the motor 19 being supported at the rear on a part of the brake caliper 16. In addition, the capacitive sensor 24 is shown schematically. In the illustration corresponding to FIG. 7, it is possible to see the heat flow which is introduced starting from the contact faces between the brake disc 17 and brake lining 18 rearward via the brake lining into the supporting ring 3 and via the latter into the actuator bottom 2. As temperature differences of several 100° C. can occur here, it becomes clear that temperature-induced deformations can prevent reproducible measurements.

The following is to be noted with respect to the influence of temperature and hysteresis. The influence of temperature on a brake can be enormous as the actuator 1 is heated up considerably in several seconds during the braking operation. The heat flow Q occurs here exclusively via the supporting ring 3, and is then distributed into the actuator bottom 2. In the process, considerable axial temperature gradients occur in the actuator bottom, which is illustrated in FIG. 1. This leads to temperature-dependent bulging ΔZ of the actuator bottom 2, and thus to an incorrect measurement. However, if a turning, in the form of a peripheral groove 8, is made in the interior of the supporting ring 3, the heat flow is introduced virtually radially into the actuator bottom 2, and a temperature-induced axial bulging ΔZ is thus precluded.

The hysteresis phenomena on the described actuator occur as a result of a relatively rigid connection of the actuator bottom 2 to the supporting ring 3. The centrally introduced braking force not only causes a deflection ΔZ at the actuator bottom 2 but also generates a torque M corresponding to FIG. 2. This torque ensures radial migration of the supporting face of the supporting ring 3. However, when the loading ceases, a considerable hysteresis effect then occurs owing to the considerable frictional effects, and said hysteresis prevents, to a certain extent, the deformation ΔZ from being reversed in proportion to the force F. According to the present inventions hysteresis is avoided in that the rigid connection between the actuator bottom 2 and supporting ring is considerably reduced in cross section. Furthermore, the connection between these two parts is arranged approximately centrally with respect to the supporting face, as illustrated in FIG. 4. Moreover, a material with a low hysteresis is used to manufacture the sensor. Special stainless special steels which can be precipitation-hardened, for example of the type 17-4PH, are preferably used. The measurement of the deformation ΔZ which is proportional to the braking force is expediently carried out in relation to the edge of the actuator. For this purpose, inductive or optical methods can be used. Capacitive measuring principles, as illustrated in FIG. 6, are also particularly suitable owing to the high temperatures. The corresponding change in capacitance arises due to a braking-force-dependent change in the electrode spacing with respect to the actuator bottom 2. A measurement signal is proportional to the deformation ΔZ, and thus to the braking force F, results from the radial strain ε of the actuator bottom 2. In this case, high-temperature measuring gauges, piezoresistive sensors, or capacitive micromechanical strain sensors are suitable as strain sensors.

What is claimed is:

1. A device for measuring force in a force flux, comprising a force sensor integrated in an actuator, said actuator having a bottom which is formed transversely with respect to the force flux and on which the force acts centrally, and a supporting ring for transmitting the force, arranged peripherally on an outer edge of the actuator bottom in the direction of force, the actuator bottom capable of being deformed by the force and comprising part of the force sensor, whereby a detectable deformation of the actuator bottom constitutes a measure of the force, the deformation comprising a central deflection of the actuator bottom relative to the edge of said actuator, and the deflection being detectable by a plate capacitor configuration having an electrode positioned on an electrode mount which is pressed, with spring support, onto a base, and wherein the actuator bottom serves as a corresponding electrode.

2. A device for measuring force in a force flux, comprising a force sensor integrated in an actuator, said actuator having a bottom which is formed transversely with respect to the force flux and on which the force acts centrally, and a supporting ring for transmitting the force, connected peripherally on an outer edge of the actuator bottom in the direction of force, and an internal peripheral groove formed to reduce a cross section of the connection so that minimized temperature gradients occur in the direction of force in the actuator bottom and so as to result in a reduced mechanical coupling between the actuator bottom and supporting ring so that transmission of force from the actuator bottom to the supporting ring is minimized, the actuator bottom capable of being deformed by the force and comprising part of the force sensor, whereby a detectable deformation of the actuator bottom constitutes a measure of the force.

3. The device according to claim 2, wherein the deformation is detectable by means selected from one or more of the following: inductive or optical measuring methods, metallic piezoresistive or semiconductor strain gauges, and strain sensors with silicon surface micromechanics.

* * * * *